No. 840,545. PATENTED JAN. 8, 1907.
N. B. YINGLING.
CULTIVATOR.
APPLICATION FILED JUNE 2, 1906.
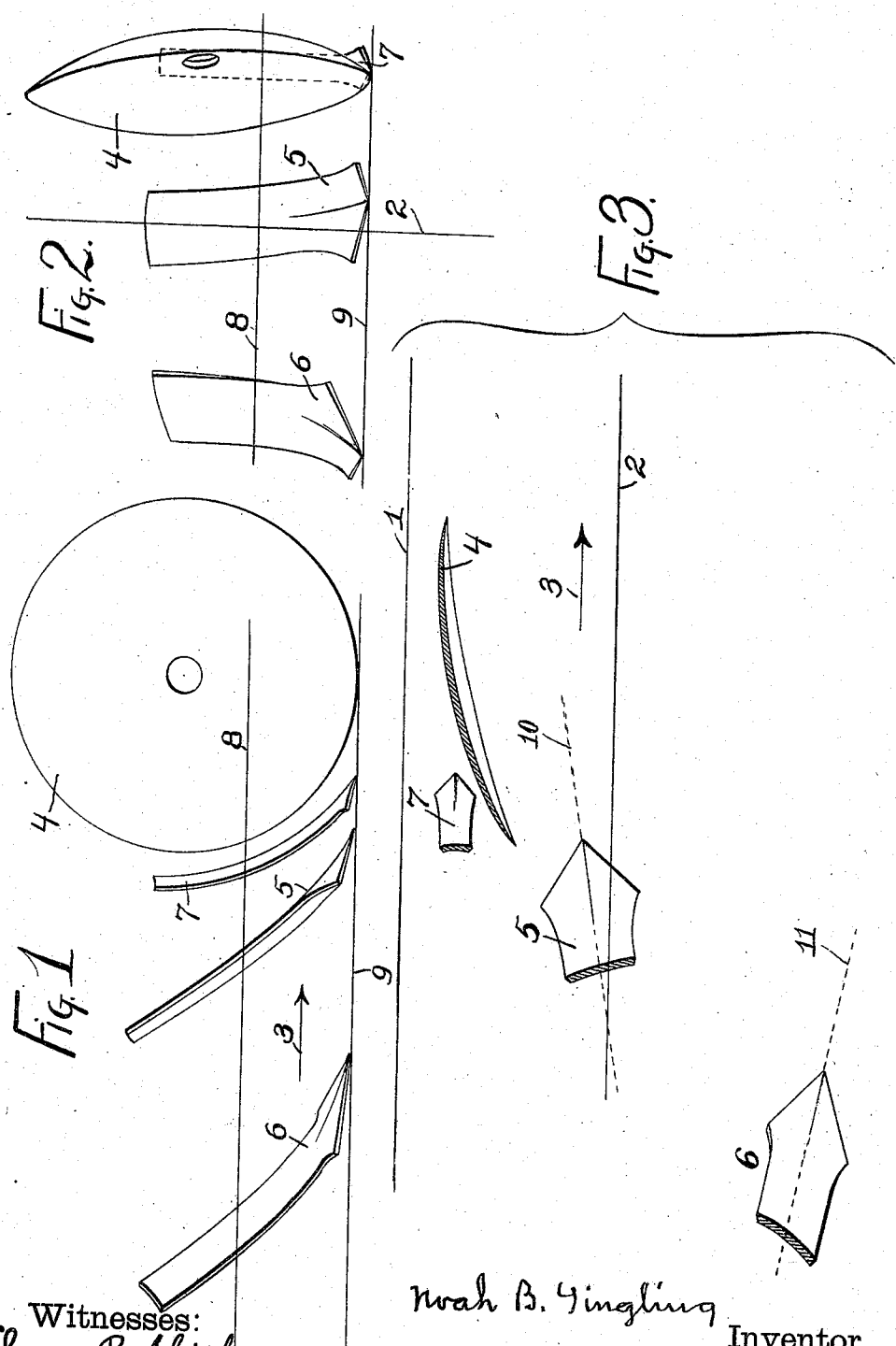
Witnesses:
Elmer R. Shipley.
M. S. Belden.
Noah B. Yingling
Inventor
by James W. See.
Attorney

UNITED STATES PATENT OFFICE.

NOAH B. YINGLING, OF SEVEN MILE, OHIO.

CULTIVATOR.

No. 840,545. Specification of Letters Patent. Patented Jan. 8, 1907.

Application filed June 2, 1906. Serial No. 319,820.

*To all whom it may concern:*

Be it known that I, NOAH B. YINGLING, a citizen of the United States, residing at Seven Mile, Butler county, Ohio, have invented certain new and useful Improvements in Cultivators, of which the following is a specification.

My invention will be readily understood from the following description, taken in connection with the accompanying drawings, in which—

Figure 1 is a side elevation of the soiling devices of a cultivator embodying my invention; Fig. 2, a front elevation of the same, and Fig. 3 a sectional plan of the same in a plane corresponding with the general upper surface of the ground being cultivated.

In the cultivation of a row of plants—say corn—it is the object to remove from alongside the plants the hard and dry soil and to substitute fine loose moist soil for it, the loose soil being obtained from the lower portions of the soil lying some distance from the plants. In the performance of this operation it is desirable to work as closely to the roots of the plants as is possible without damage to them. Various forms of soiling implements have been employed for this work, cultivators being generally typified by a cultivator-tooth furrowing alongside the row of plants to remove the hard soil and throw it aside, a tooth farther to the rear and farther from the plant row serving to throw subsoil toward the plant row, these two teeth being sometimes followed by others. Cultivator-teeth of whatever form have the capacity for upheaving and shifting the soil, but have no satisfactory capacity for pulverizing it. Again, a cultivating-tooth otherwise satisfactory becomes a somewhat dangerous implement if worked very close to the roots of the plant.

Cultivating has been done by means of obliquely-set disks, and disks have the capacity for affecting a bold transference of the soil, and in the course of their action they effect a pulverizing of the soil, a disk being, in effect, a plow and a harrow. A disk may be safely run much closer to the plant-roots than would be practicable with a tooth; but a disk brings about a very considerable side draft, and a plurality of disks have not been satisfactorily arranged to bring about the movement of the hard soil from the plant row and the substitution therefor of loose soil brought from a more distant point.

My improved cultivator employs a combination of disk and teeth having peculiar relationship to each other and bringing about decidedly-improved results in cultivating. These improved results are due to association and relationship of the parts actually engaging the soil, and the individual parts themselves are the same as has been heretofore employed in other associations and relationships, both as to form and as to manner of mounting upon the cultivator beam or frame. My improved cultivator may also follow the usual lines as to general classification—that is to say, the cultivator may be single to cultivate at one side of a plant row, or double to straddle the row, or pluralized still further to deal with more than one plant row at once. I illustrate the invention in the simplest type—that is, as arranged to cultivate at one side only of the plant row.

In the drawings, 1 is a line indicating the plant row; 2, the line of draft of the cultivator, parallel, of course, with the plant row, which line may be taken as representing substantially the center line of the usual cultivator-beam; 3, direction of cultivator travel; 4, cultivating-disk set obliquely, as usual, and arranged to travel as close as practicable to the plant row; 5, a cultivator-tooth set outwardly beyond the disk to the rear of its field of action, this tooth being of any of the usual forms adapted to turn up and cast sidewise the soil in which it works and being so set as to cast the soil toward the plant row; 6, a tooth set still farther outwardly from the plant row and preferably somewhat to the rear of the tooth 5, this outside tooth 6 being so set as to cast the soil in which it works in a direction away from the plant row; 7, a tooth preferably comparatively narrow set between the disk and the plant row and to the rear of the vertical plane of the center of the disk; 8, a line indicating in a general way the top level of the soil being worked; 9, a line indicating in a general way the working depth of the disk and teeth; 10, a line indicating in a general way the angular setting of the tooth 5 relative to the line of draft 2, and 11 a similar line indicating in a general way the angular setting of the outer tooth 6 relative to the line of draft.

Turning to Fig. 2, which is a front view of the soiling implements, disk 4 is to run as close as practicable to the row of plants. It can safely be run much closer to the plants than would be expedient with any form of tooth or share doing the comparatively heavy work of this disk. It is the duty of the disk to remove the hard dry soil against the sides of the roots and to cast that soil sidewise away from the plant row. In doing this the disk also effects a degree of pulverization of the excavated soil far beyond the capacity of any tooth-like implement. In practice it has been found that the disk may with safety be run so close to the plant row as to actually strip the sides of many of the roots of the soil, and this without injury to the roots. The soil thus furrowed out by the disk and pulverized and cast away from the plant row has its harder and heavier masses thrown sidewise beyond the range of action of the tooth 5. The tooth 5 follows the disk, but a trifle outwardly beyond it, and works in the fine and comparatively moist subsoil, and it throws this soil inwardly against the roots, thus replacing the soil removed by the disk, the substituted soil being composed of fine loose subsoil and of the finest pulverized product of the disk action. The third tooth 6 has a triple office. It loosens up the soil at a point outwardly beyond the action of the other implements, it casts still further from the plant row the heavier masses of hard soil which have been cast away from the plant row by the disk, and it brings about a side strain opposed to and compensating for the side strain inherent in the action of the disk, thus fairly balancing the group and permitting it being satisfactorily guided as a unit. The degree of relative angular setting of the soiling implements thus far referred to, as well as the depth of their working, will vary, of course, with the character of the soil being worked and with the condition of advancement of the plants.

Under many and even most conditions nothing is needed to supplement the action of the implements thus far referred to; but, as is well known, the concave disk cannot cut a furrow with a vertical land, the landshore of the produced furrow being necessarily of a concave cross-section, an excess of soil being left against the sides of the roots at the base of the furrow. Again, in some soils it is found that the pressure of the convex side of the disk produces upon the land side of the furrow a certain degree of undesired compacting of the soil, the effect being in some soils to bring about even a slight "plastering," so to speak, or polishing of the land side of the furrow. When this condition is found to exist, I add the tooth 7, which follows the disk and digs out the lower land corner of the furrow. It performs the double office of scratching this side of the furrow to remove any compacting effect which may have been brought about by the disk, and it changes the shape of the base of the land side of the furrow, so as to make room at that point for the reception of fine loose soil taken from elsewhere, or it loosens up the soil located in that portion of the furrow. Its work is very light and it may, in conjunction with the disk, run much closer to the plant row than any tooth implement or share implement could be safely run alone. The general result of my improved system is a more perfect cultivation than has heretofore been accomplished by any system of implements within my knowledge.

I claim—

1. A cultivator comprising an obliquely-set concavo-convex disk arranged to run with its convexity toward the plant row and cast the soil therefrom, a tooth set to the rear of the disk and farther from the plant row and arranged to cast the soil toward the plant row and into the furrow produced by the disk, and a tooth set rearward of the first-mentioned tooth and farther outwardly from the plant row and arranged to cast the soil in the direction away from the plant row, combined substantially at set forth.

2. A cultivator comprising an obliquely-set concavo-convex disk arranged to run with its convexity toward the plant row and cast the soil therefrom, a tooth set to the rear of the disk and farther from the plant row and arranged to cast the soil toward the plant row and into the furrow produced by the disk, and a tooth disposed contiguous to the convex side of the disk and rearward of its center and arranged to attack the soil at the base of the land side of the furrow produced by the disk, combined substantially as set forth.

3. A cultivator comprising an obliquely-set concavo-convex disk arranged to run with its convexity toward the plant row and cast the soil therefrom, a tooth set to the rear of the disk and farther from the plant row and arranged to cast the soil toward the plant row and into the furrow produced by the disk, a tooth set rearward of the first-mentioned tooth and farther outwardly from the plant row and arranged to cast the soil in the direction away from the plant row, and a tooth disposed contiguous to the convex side of the disk and rearwardly at its center and arranged to attack the soil at the base of the land side of the furrow produced by the disk, combined substantially as set forth.

NOAH B. YINGLING.

Witnesses:
PAUL M. HOOVEN,
M. S. BELDEN.